(12) United States Patent
Ha

(10) Patent No.: US 12,055,693 B2
(45) Date of Patent: Aug. 6, 2024

(54) CAMERA MODULE USING SMALL REFLECTOR, AND OPTICAL DEVICE FOR AUGMENTED REALITY USING SAME

(71) Applicant: LETINAR CO., LTD, Anyang-si (KR)

(72) Inventor: Jeong Hun Ha, Seoul (KR)

(73) Assignee: LETINAR CO., LTD

( * ) Notice: Subject to any disclaimer, the term of this patent is extended or adjusted under 35 U.S.C. 154(b) by 171 days.

(21) Appl. No.: 17/624,570

(22) PCT Filed: Jul. 3, 2020

(86) PCT No.: PCT/KR2020/008744
§ 371 (c)(1),
(2) Date: Jan. 3, 2022

(87) PCT Pub. No.: WO2021/002728
PCT Pub. Date: Jan. 7, 2021

(65) Prior Publication Data
US 2022/0276471 A1    Sep. 1, 2022

(30) Foreign Application Priority Data

Jul. 3, 2019 (KR) .......................... 10-2019-0080347

(51) Int. Cl.
*G02B 13/00* (2006.01)
*G02B 27/01* (2006.01)
(Continued)

(52) U.S. Cl.
CPC ..... *G02B 13/0065* (2013.01); *G02B 27/0172* (2013.01); *H04N 23/45* (2023.01); *H04N 23/55* (2023.01); *G02B 2027/0138* (2013.01)

(58) Field of Classification Search
CPC ............ G02B 13/0065; G02B 27/0172; G02B 2027/0138; H04N 23/45; H04N 23/55;
(Continued)

(56) References Cited

U.S. PATENT DOCUMENTS

| 7,382,410 B2 * | 6/2008 | Togino | H04N 23/55 348/335 |
| 11,146,730 B2 * | 10/2021 | Aoki | H04N 23/69 |

(Continued)

FOREIGN PATENT DOCUMENTS

| JP | 2002244235 A | 8/2002 |
| JP | 2002258208 A | 9/2002 |

(Continued)

*Primary Examiner* — Nhan T Tran
(74) *Attorney, Agent, or Firm* — Rabin & Berdo, P.C.

(57) ABSTRACT

The present invention is directed to a camera module using a small reflective unit and an optical device for augmented reality using the same, and provides a camera module using a small reflective unit, the camera module including a lens unit configured such that one or more lenses are disposed therein and an image sensor configured to convert image light, incident through the lens unit, into an electrical signal and output the electrical signal, the camera module further including a reflective unit configured to transfer incident image light to the lens unit by reflecting the incident image light; wherein the reflective surface of the reflective unit is disposed to be inclined with respect to the optical axis of incident light in order to reflect incident image light to the lens unit, and acts as an aperture for the incident light.

4 Claims, 10 Drawing Sheets

(51) Int. Cl.
*H04N 23/45* (2023.01)
*H04N 23/55* (2023.01)

(58) Field of Classification Search
CPC ...... H04N 23/57; H04N 13/236; G03B 30/00;
G03B 17/17; G03B 17/02
See application file for complete search history.

(56) References Cited

U.S. PATENT DOCUMENTS

| | | | |
|---|---|---|---|
| 2012/0007839 A1* | 1/2012 | Tsao | G02B 26/00 |
| | | | 345/204 |
| 2012/0105594 A1 | 5/2012 | You et al. | |
| 2020/0257182 A1* | 8/2020 | Takahashi | H04N 23/667 |

FOREIGN PATENT DOCUMENTS

| | | | |
|---|---|---|---|
| JP | 2002271676 | A | 9/2002 |
| JP | 2013242413 | A | 12/2013 |
| JP | 2016500962 | A | 1/2016 |
| JP | 2017524976 | A | 8/2017 |
| JP | 2017187771 | A | 10/2017 |
| KR | 1020090090304 | A | 8/2009 |
| KR | 1020140051030 | A | 4/2014 |
| KR | 1020180086437 | A | 7/2018 |
| KR | 1020190032572 | A | 3/2019 |
| KR | 102099232 | B1 | 4/2020 |
| WO | 2016086439 | A1 | 6/2016 |
| WO | 2019102313 | A1 | 5/2019 |

* cited by examiner

CAMERA MODULE USING SMALL REFLECTOR, AND OPTICAL DEVICE FOR AUGMENTED REALITY USING SAME

TECHNICAL FIELD

The present invention relates to a camera module and an optical device for augmented reality using the same, and more particularly to a camera module using a small reflective unit that may reduce the size of a device and facilitate the light optimization design of a camera module by utilizing a small reflective unit, and an optical device for augmented reality using the same.

BACKGROUND ART

As is well known, camera modules are included in mobile devices such as smartphones, tablet PCs, and laptop computers.

A camera module used in such mobile devices generally includes a lens unit configured such that one or more lenses are disposed therein and an image sensor configured to convert image light, incident through the lens unit, into an electrical signal and output it.

FIG. 1 is a diagram schematically showing the general structure of a conventional camera module 100.

As shown in FIG. 1, a camera module 100 includes a lens unit 101 and an image sensor 102. In general, one or more lenses are sequentially disposed in the lens unit 101, and the image sensor 102 converts image light, incident onto the lens unit 101, into an electrical signal and outputs the electrical signal.

The conventional camera module 100 is also reduced in overall size and volume as the sizes of mobile devices, such as smart phones, are reduced. However, in addition to this, as the performance of the camera module 100 is also rapidly developed, a plurality of lenses is employed to provide higher optical performance. Therefore, a problem arises in that the lens unit 101 protrudes to the outside as shown in FIG. 1 because there is a limitation on increasing the focal length, and thus there is a limitation on reducing the overall width w.

DISCLOSURE

Technical Problem

The present invention is intended to overcome the above-described problems, and an object of the present invention is to provide a camera module using a small reflective unit that may reduce the size of a device and facilitate the light optimization design of a camera module by utilizing a small reflective unit.

Another object of the present invention is to provide an optical device for augmented reality that may be used as a photographing device while providing an image for augmented reality by utilizing a camera module using a small reflective unit.

Technical Solution

In order to overcome the above-described problems, the present invention provides a camera module using a small reflective unit, the camera module including a lens unit configured such that one or more lenses are disposed therein and an image sensor configured to convert image light, incident through the lens unit, into an electrical signal and output the electrical signal, the camera module further including a reflective unit configured to transfer incident image light to the lens unit by reflecting the incident image light; wherein the reflective surface of the reflective unit is disposed to be inclined with respect to the optical axis of incident light in order to reflect incident image light to the lens unit, and acts as an aperture for the incident light.

According to another aspect of the present invention, there is provided a camera module using a small reflective unit, the camera module including an image sensor configured to convert incident image light into an electrical signal and output the electrical signal, the camera module further including a reflective unit configured to transfer incident image light to the lens unit by reflecting the incident image light; wherein a reflective surface of the reflective unit is disposed to be inclined with respect to an optical axis of incident light in order to reflect incident image light to the image sensor, and acts as an aperture for the incident light; and wherein the reflective surface of the reflective unit is formed as a concave surface with respect to an incident direction of the image light incident onto the reflective unit.

According to still another aspect of the present invention, there is provided a camera module using a small reflective unit, the camera module including a lens unit configured such that one or more lenses are disposed therein and an image sensor configured to convert image light, incident through the lens unit, into an electrical signal and output the electrical signal, the camera module further including a reflective unit configured to transfer incident image light to the lens unit by reflecting the incident image light; wherein the reflective surface of the reflective unit is disposed to be inclined with respect to the optical axis of incident light in order to reflect incident image light to the lens unit, and acts as an aperture for the incident light; and wherein the reflective surface of the reflective unit is formed as a convex surface with respect to the incident direction of the image light incident onto the reflective unit.

In this case, the lens unit may be formed as a concave lens.

According to still another aspect of the present invention, there is provided a camera module using a small reflective unit, the camera module including a lens unit configured such that one or more lenses are disposed therein and an image sensor configured to convert image light, incident through the lens unit, into an electrical signal and output the electrical signal, the camera module further including a reflective unit configured to transfer incident image light to the lens unit by reflecting the incident image light; wherein the reflective surface of the reflective unit is disposed to be inclined with respect to the optical axis of incident light in order to reflect incident image light to the lens unit, and acts as an aperture for the incident light; wherein the reflective surface of the reflective unit is formed as a curved surface having a curvature with respect to the incident direction of image light incident onto the reflective unit, and the lens unit is formed as a curved surface having a curvature with respect to the incident direction of image light incident onto the lens unit; and wherein the reflective unit is embedded in an optical means having a refractive index.

According to still another aspect of the present invention, there is provided a camera module using a small reflective unit, the camera module including first and second lens units each configured such that at least one lens is disposed therein and first and second image sensors configured to convert image light, incident through the lens units, into electrical signals and output the electrical signals, the camera module further including: a first reflective unit having a hole formed in the center thereof, and configured to transfer incident image light to the first lens unit by reflecting the incident image light; and a second reflective unit disposed inside the hole, and configured to transfer incident image light to the second lens unit by reflecting the incident image light; wherein the first reflective unit and the second reflective unit are arranged such that the reflective surfaces of the first and second reflective units are arranged to be inclined with respect to the optical axes of beams of incident light in order to reflect beams of incident image light to the first and second lens units, respectively; and wherein the inclination angle of the second reflective unit is not parallel to the inclination angle of the first reflective unit.

In this case, the second reflective unit preferably has a smaller size than the first reflective unit.

Furthermore, the optical axes of beams of output light output to the first and second lens units are preferably parallel to each other.

According to still another aspect of the present invention, there is provided a camera module using a small reflective unit, the camera module including first and second lens units each configured such that at least one lens is disposed therein and first and second image sensors configured to convert image light, incident through the lens units, into electrical signals and output the electrical signals, the camera module further including: a first reflective unit made of a translucent material, and configured to transfer incident image light to the first lens unit by reflecting the incident image light; and a second reflective unit disposed behind the first reflective unit with respect to incident image light, and configured to transfer incident image light to the second lens unit by reflecting the incident image light; wherein the first reflective unit and the second reflective unit are arranged such that the reflective surfaces of the first and second reflective units are arranged to be inclined with respect to the optical axes of beams of incident light in order to reflect beams of incident image light to the first and second lens units, respectively; and wherein the inclination angle of the second reflective unit is not parallel to the inclination angle of the first reflective unit.

In this case, the second reflective unit preferably has a smaller size than the first reflective unit.

Furthermore, the optical axes of beams of output light output to the first and second lens units are preferably parallel to each other.

According to still another aspect of the present invention, there is provided a composite camera module including a plurality of above-described camera modules; wherein each of the camera modules is disposed on a plane perpendicular to the optical axis of incident image light.

In this case, each of the camera modules is preferably disposed on the perpendicular plane.

Furthermore, the camera modules may be disposed at intervals of the same angle around a central point that is the intersection point of a connection line connecting the reflective units of the unit camera modules disposed on the perpendicular plane.

According to still another aspect of the present invention, there is provided an optical device for augmented reality, the optical device including: the above-described camera module; and an image output unit configured to output image light corresponding to an image for augmented reality; wherein the reflective unit is disposed such that the reflective surface of the reflective unit is inclined with respect to the optical axis of the incident light in order to reflect image light, incident from a real world, to the lens unit; and wherein the reverse surface of the reflective unit other than the reflective surface transfers image light corresponding to an image for augmented reality, output from the image output unit, to the pupil of the eye of a user by reflecting the image light toward the pupil, thereby providing the image for augmented reality to the user.

In this case, the image output unit is preferably disposed in the direction opposite to the direction in which the lens unit is disposed with respect to the reflective unit.

Advantageous Effects

According to the present invention, there is provided the camera module using a small reflective unit that may reduce the size of a device and facilitate the light optimization design of a camera module by utilizing the small reflective unit.

Furthermore, the present invention may provide the optical device for augmented reality that may be used as a photographing device while providing an image for augmented reality by utilizing the camera module using a small reflective unit.

DESCRIPTION OF DRAWINGS

FIGS. 2A and 2B are diagrams showing a camera module (200) using a small reflective unit according to an embodiment of the present invention, wherein FIG. 2A is a side view and FIG. 2B is a front view;

FIGS. 8 and 9 are views illustrating an optical device (600) for augmented reality including a camera module (200) according to the present invention, wherein FIG. 8 is a side view and FIG. 9 is a front view.

BEST MODE

Embodiments according to the present invention will be described in detail below with reference to the accompanying drawings.

Figure 1:
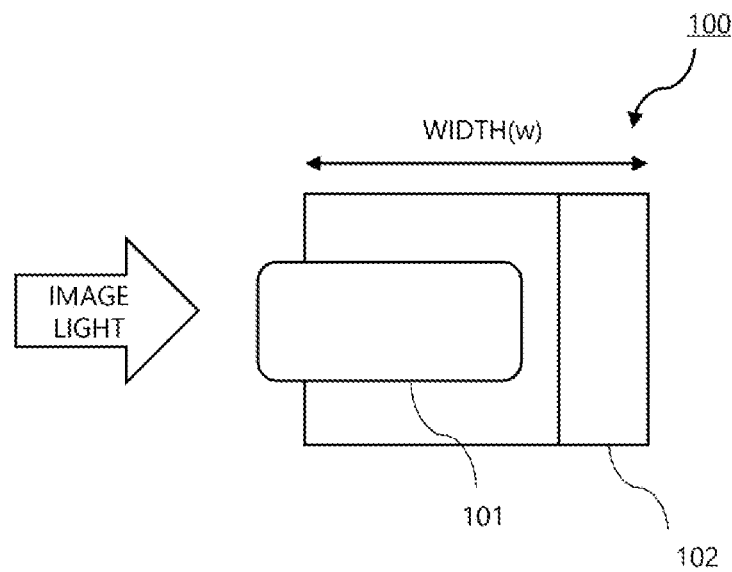
FIG. 1 is a diagram schematically showing the general structure of a conventional camera module (100)
Figure 2A:
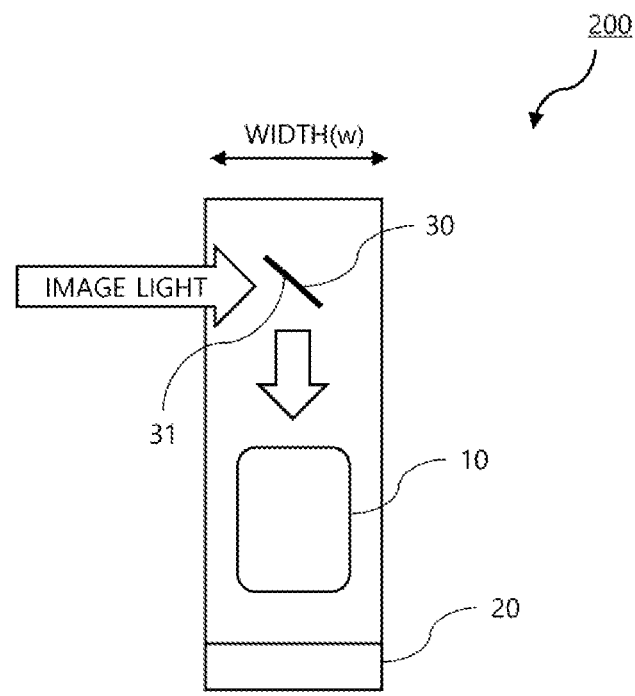
Figure 2B:
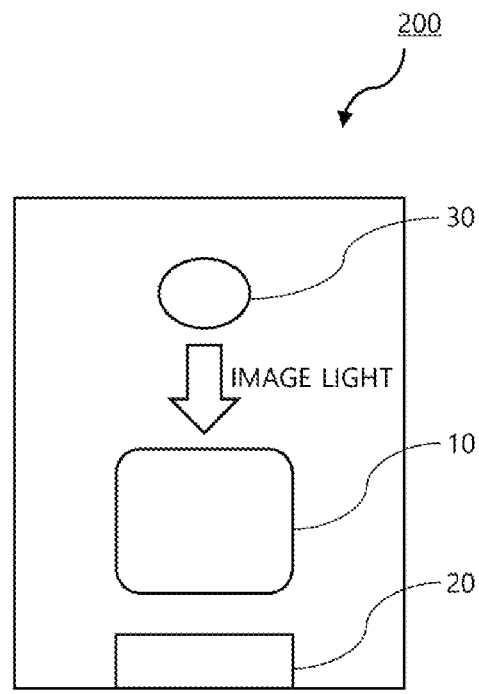

FIGS. 2A and 2B are diagrams showing a camera module 200 using a small reflective unit according to an embodiment of the present invention, wherein FIG. 2A is a side view and FIG. 2B is a front view.

Referring to FIGS. 2A and 2B, the camera module 200 using a small reflective unit (hereinafter simply referred to as the "camera module 200") according to the present embodiment includes a lens unit 10, an image sensor 20, and a reflective unit 30.

In this case, the lens unit 10 has one or more lenses (not shown) disposed therein, and performs a function of transferring image light, output from an object in the real world and incident through the reflective unit 30, to the image sensor 20.

The image sensor 20 converts image light, incident through the lens unit 10, into an electrical signal and outputs the electrical signal.

Since the lens unit 10 and the image sensor 20 themselves are not direct targets of the present invention and are well known in the prior art, detailed descriptions thereof will be omitted.

The reflective unit 30 is a means for reflecting image light incident from the outside (the real world) through an opening (not shown) and transferring the image light to the lens unit 10. The reflective surface 31 of the reflective unit 30 is disposed to be inclined with respect to the optical axis of incident light in order to reflect incident image light to the lens unit 10. With this arrangement, the reflective unit 30 acts as an aperture for incident light.

In other words, the reflective unit 30 is disposed such that the reflective surface 31 of the reflective unit 30 is not parallel to the optical axis of incident light and so that the optical axis of the incident image light (incident light) and the optical axis of image light (output light) output to the lens unit 10 are not parallel to each other.

In order to reduce the width w of a mobile device, such as a smartphone, on which the camera module 200 is mounted, to the minimum possible, the reflective surface 31 of the reflective unit 30 is preferably disposed to have an angle of 45° with respect to the optical axis of incident light. In this case, the optical axis of the incident light and the optical axis of the output light output to the lens unit 10 are perpendicular to each other. Accordingly, image light incident onto the reflective unit 30 and image light output from the reflective unit 30 are also perpendicular to each other.

Meanwhile, it is preferable that the reflective unit 30 in the present invention be formed to have a size smaller than the size of the human pupil. It is known that the size of the human pupil is generally 8 mm or less. When the reflective unit 20 is formed to be smaller than the pupil, the depth of field for light incident onto the pupil through the reflective unit 20 can be made almost infinite, i.e., considerably deep. In this case, the depth of field refers to a range within which an image is recognized as being in focus. When the depth of field increases, this means that a focal length increases. This may be viewed as a type of pinhole effect.

Based on this principle, the reflective unit 30 in the present invention is preferably formed to have a size smaller than the human pupil size, i.e., a size of 8 mm or less, more preferably a size of 4 mm or less, in order to obtain a pinhole effect by increasing the depth of field.

In other words, by forming the reflective unit 30 to have a size smaller than the size of the normal human pupil, the depth of field for the image light incident through the reflective unit 30 can be made almost infinite, i.e., considerably deep. Accordingly, an image having a high depth of field can be obtained through the lens unit 10 and the image sensor 20.

With this configuration, the reflective unit 30 acts as an aperture for incident light. Accordingly, there is no need for a component such as a separate aperture, and as a result the size of the camera module 200 may be reduced and the structure thereof may be simplified.

Furthermore, it is preferable that the reflective unit 30 have a shape without an edge, and it is more preferable that it be formed in a circular shape.

Figure 3A:
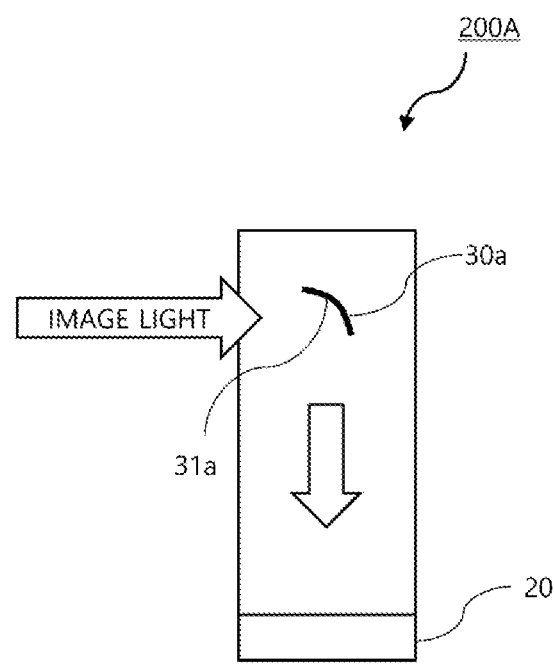
FIG. 3A is a side view of a camera module (200A) according to another embodiment of the present invention.

FIG. 3A is a side view of a camera module 200A according to another embodiment of the present invention.

Although the camera module 200A of the embodiment of FIG. 3A is basically the same as that of the embodiment of FIGS. 2A and 2B, it is different in that the lens unit 10 is omitted from the camera module 200. Accordingly, the camera module 200A includes an image sensor 20 and a reflective unit 30a, and the reflective unit 30a transfers image light, incident from the outside (the real world), to the image sensor 20 by reflecting the image light.

Furthermore, the reflective surface 31a of the reflective unit 30a is disposed to be inclined with respect to the optical axis of incident light in order to reflect incident image light to the image sensor 20, and thus acts as an aperture for incident light. Additionally, the reflection surface 31a of the reflective unit 30a is formed as a concave surface with respect to the incident direction of image light incident onto the reflective unit 30a, and thus replaces the function of the omitted lens unit 10. In the embodiment of FIG. 3A, the reflective surface 31a of the reflective unit 30a is formed as a concave surface with respect to the incident direction of image light incident onto the reflective unit 30a. Accordingly, the reflective surface 31a of FIG. 3A acts as a concave mirror, and the reflective unit 30a performs the function of an aperture, the function of a concave mirror, and the function of the omitted lens unit 10 together.

Figure 3B:
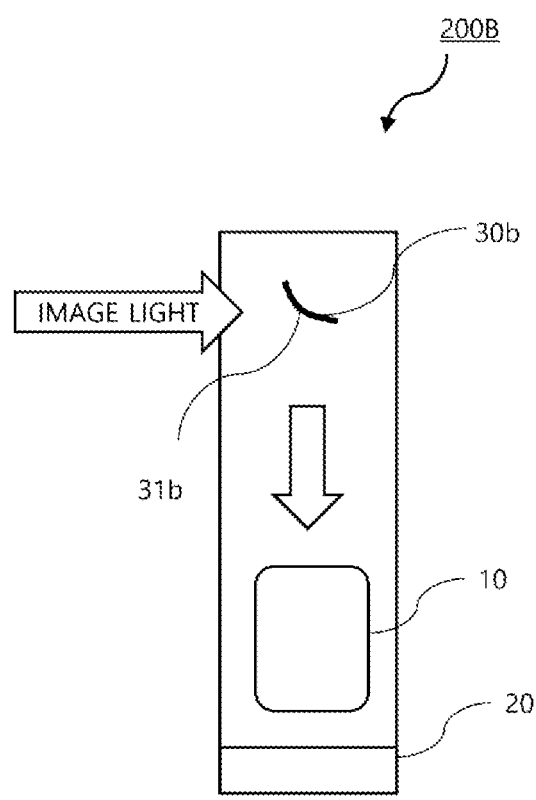
FIG. 3B is a side view of a camera module (200B) according to another embodiment of the present invention.

FIG. 3B is a side view of a camera module 200B according to another embodiment of the present invention.

Although the camera module of the embodiment of FIG. 3B is the same as the camera module 200 of the embodiment of FIGS. 2A and 2B, it is different in that the reflective surface 31b of a reflective unit 30b is formed as a convex surface with respect to the incident direction of image light incident onto the reflective unit 30b. Accordingly, the reflective unit 30b functions as a diaphragm as described above, and also acts as a convex mirror.

In this case, the image light reflected by the reflective surface 31b has the property of being diffused by the reflective surface 31b acting as a convex mirror, so that the lens unit 10 is preferably formed as a concave lens.

Figure 3C:
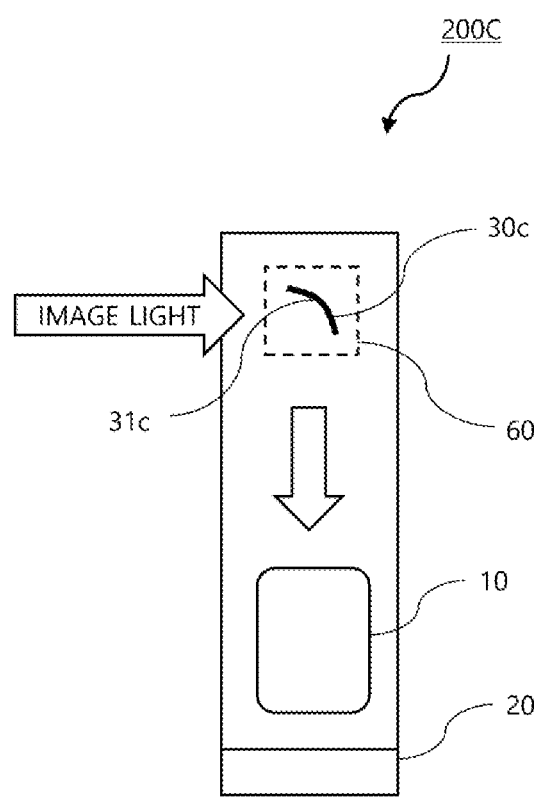
FIG. 3C is a side view of a camera module (200C) according to still another embodiment of the present invention.

FIG. 3C is a side view of a camera module 200C according to still another embodiment of the present invention.

Although the camera module of the embodiment of FIG. 3C is the same as the camera module 200 of the embodiment of FIGS. 2A and 2B, it is different in that a reflective unit 30c and a lens unit 10 have curvatures and the reflective unit 30c is embedded in an optical means 60 having a refractive index, so that optical performance is optimized.

In other words, the reflective surface 31c of the reflective unit 30c is formed as a curved surface having a curvature, such as a concave mirror or a convex mirror, with respect to the incident direction of image light incident onto the reflective unit 30c, as described above, and the lens unit 10 is also formed as a curved surface having a curvature with respect to the incident direction of image light incident onto the lens unit 10. For example, the lens unit 10 may be formed to include a convex lens or a concave lens depending on whether the reflective unit 30c is a concave mirror or a convex mirror. Furthermore, the camera module is characterized in that the optical means 60 having a refractive index adapted to optimize desired optical performance is disposed and the reflective unit 30c is embedded in the optical means 60.

According to this configuration, there is an advantage in that optical performance may be optimized by the combination of the refractive index of the optical means 60, the curvature of the reflective unit 30c, and the curvature of the lens unit 10.

Figure 4:
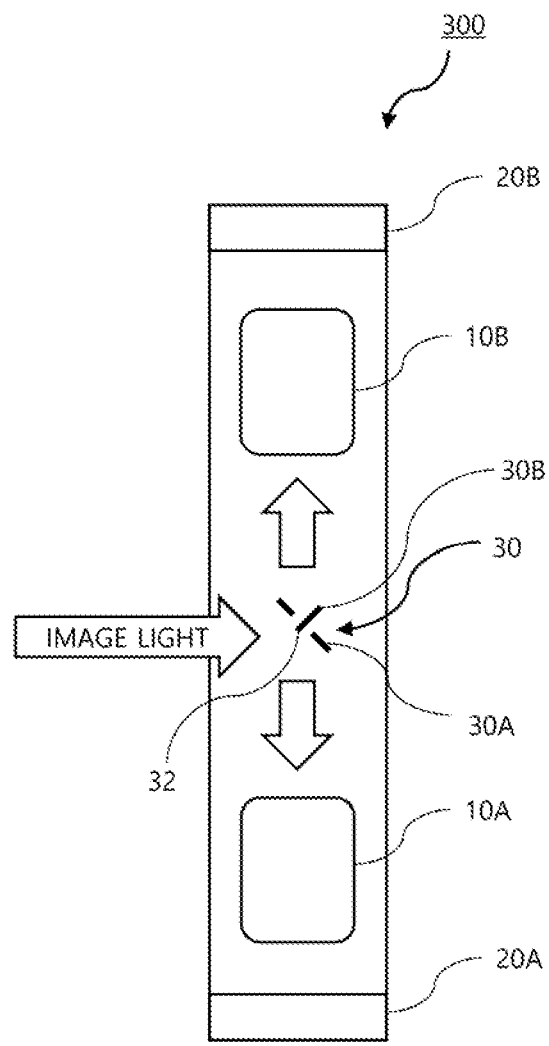
FIG. 4 is a side view illustrating a camera module (300) according to another embodiment of the present invention.

FIG. 4 is a side view illustrating a camera module 300 according to another embodiment of the present invention.

Although the camera module 300 of the embodiment of FIG. 4 is basically the same as that of the embodiment described in conjunction with FIGS. 2A to 2B, it is different in that a reflective unit 30 includes a first reflective unit 30A and a second reflective unit 30B and a lens unit 10A or 10B and an image sensor 20A or 20B are independently coupled to each of the reflective units 30A and 30B.

Referring to FIG. 4, although the first reflective unit 30A is the same as the reflective unit 30 described in conjunction with the embodiment of FIGS. 2A and 2B, it is different in that a hole 32 is formed in the center of the first reflective unit 30A.

In addition, although the second reflective unit 30B is basically the same as the reflective unit 30 described in conjunction with the embodiment of FIGS. 2A and 2B, it is different in that it has a smaller size than the first reflective unit 30A and is disposed so that the inclination angle of the second reflective unit 30B is not parallel to the inclination angle of the first reflective unit 30A inside the hole 32 of the first reflective unit 30A.

The first reflective unit 30A and the second reflective unit 30B are arranged such that in order to reflect incident image light to the first lens unit 10A and the second lens unit 10B, the reflective surfaces of the first reflective unit 30A and the second reflective unit 30B are disposed to be inclined with respect to the optical axis of incident light, as described in conjunction with FIGS. 2A and 2B.

The image light reflected by the first reflective unit 30A and output is transferred to the first lens unit 10A as described in conjunction with FIGS. 2A and 2B and is then transferred to the first image sensor 20A through the first lens unit 10A.

Furthermore, the image light reflected by the second reflective unit 30B and output is transferred to the second lens unit 10B and is then transferred to the second image sensor 20B through the second lens unit 10B.

Electrical signals output from the first image sensor 20A and the second image sensor 20B are synthesized by an image synthesis unit (not shown) and generate a final image.

Figure 5:
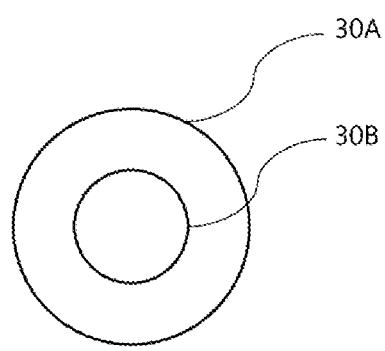
FIG. 5 is a front view of a first reflective unit (30A) and a second reflective unit (30B)

FIG. 5 is a front view of the first reflective unit 30A and the second reflective unit 30B.

As shown in FIG. 5, the second reflective unit 30B having a smaller size than the first reflective unit 30A is disposed inside the hole 32 formed in the central portion of the first reflective unit 30A. Since FIG. 5 is a front view, the hole 32 is not visible because it is hidden by the second reflective unit 30B.

For example, when the size of the first reflective unit 30A is set to 4 mm or less as described above, the size of the second reflective unit 30B may be set to 2 mm or less.

It is preferable that the reflective units 30 of the embodiment of FIGS. 4 and 5 be also arranged such that the reflective surfaces of the first reflective unit 30A and the second reflective unit 30B are disposed to have an angle of 45° with respect to the optical axis of the incident light and the reflective surfaces of the first reflective unit 30A and the second reflective unit 30B are perpendicular to each other, as previously described in conjunction with the embodiment of FIGS. 2A and 2B.

In this case, the optical axes of the light output to the first lens unit 10A and the light output to the second lens unit 10B are parallel to each other.

According to the present embodiment, since the size of the second reflective unit 30B is smaller than that of the first reflective unit 30A, it may be possible to generate an image having a higher depth of field than an image generated by the first reflective unit 30A.

Furthermore, there is an advantage in that it is easy to synthesize images generated via the image sensors 20A and 20B because the images are generated using beams of image light incident through the same opening (not shown).

Figure 6:
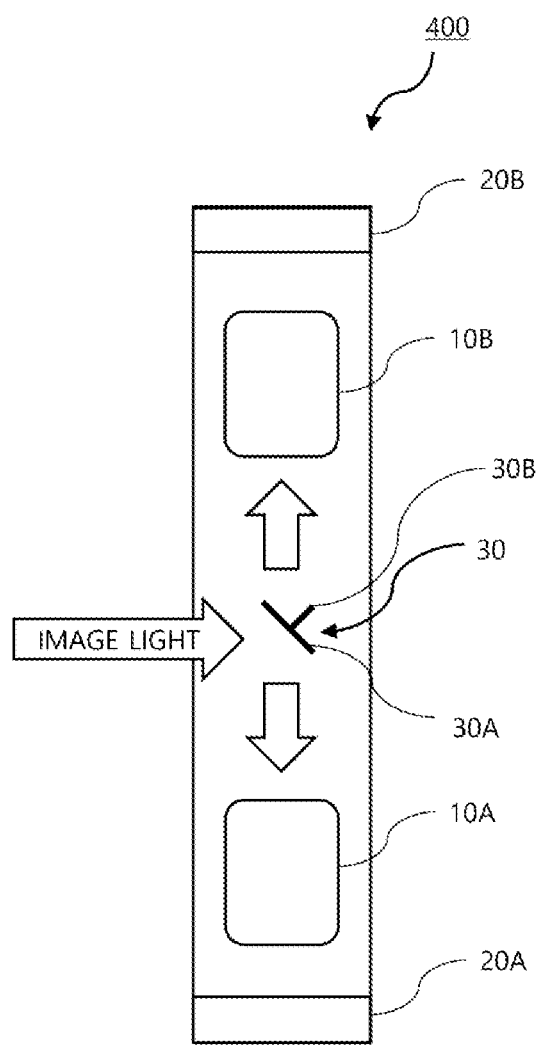
FIG. 6 is a side view illustrating a camera module (400) according to still another embodiment of the present invention.

FIG. 6 is a side view illustrating a camera module 400 according to still another embodiment of the present invention.

Although the camera module 400 of the embodiment of FIG. 6 is the same as that of the embodiment of FIG. 4, it is different in that a first reflective unit 30A is made of a translucent material and the hole 32 is not formed.

In this case, the translucent material implies that incident image light is partially transmitted. Since a configuration that partially transmits light itself is not a direct object of the present invention and is well known in the prior art, a detailed description thereof will be omitted.

Furthermore, although a second reflective unit 30B is the same as that of the embodiment of FIG. 4, it is different in that it is not disposed inside the hole 32 but is disposed behind the first reflective unit 30A with respect to incident image light. Since the first reflective unit 30A is made of a translucent material, the second reflective unit 30B transfers the image light, transmitted through the first reflective unit 30A, to the second lens unit 10B.

Also in the embodiment of FIG. 6, the size of the second reflective unit 30B is formed to be smaller than that of the first reflective unit 30A, an image having a higher depth of field than an image generated by the first reflective unit 30A may be generated.

Furthermore, in the embodiment of FIG. 6, there is an advantage in that it is easy to synthesize images generated via the image sensors 20A and 20B because the images are generated using beams of image light incident through the same opening (not shown), as in the embodiment of FIGS. 4 and 5.

Figure 7:
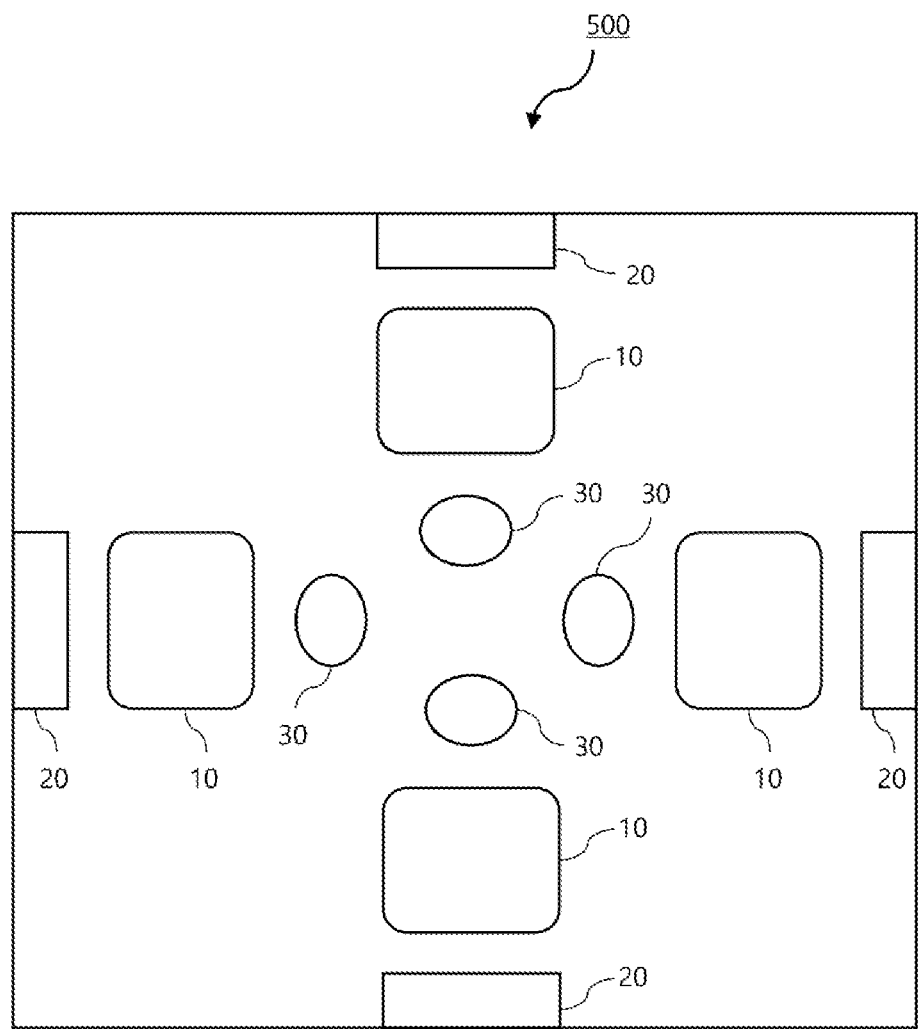
FIG. 7 is a view illustrating a case in which a composite camera module (500) is implemented by forming a plurality of camera modules (200, 300, and 400) according to an embodiment of the present invention.

FIG. 7 is a view illustrating a case in which a composite camera module 500 is implemented by forming the plurality of camera modules 200, 200A, 200B, 200C, 300, and 400 according to an embodiment of the present invention.

The complex camera module 500 of FIG. 7 is characterized in that the plurality of camera modules 200, 200A, 200B, 200C, 300, and 400 according to the above-described embodiment is disposed.

In other words, the embodiment of FIG. 7 is characterized in that the lens unit 10, the image sensor 20, and the reflective unit 30 are combined with one another and form one unit camera module 200, 200A, 200B, 200C, 300, or 400 and the reflective unit 30 of each unit camera module 200, 200A, 200B, 200C, 300, or 400 transfers image light to the combined lens unit 10 by reflecting it.

In FIG. 7, four unit camera modules 200, 200A, 200B, 200C, 300, and/or 400 are arranged and the unit camera modules 200, 200A, 200B, 200C, 300, and/or 400 are arranged to have an angle of 90° with respect to each other around the center point thereof.

In this case, each of the unit camera modules 200, 200A, 200B, 200C, 300, and/or 400 is preferably arranged on a plane perpendicular to the optical axis of incident image light.

Furthermore, the individual unit camera modules 200, 200A, 200B, 200C, 300, and/or 400 are preferably arranged at intervals of the same angle around a central point that is the intersection point of a connection line connecting the reflective units 30 of the unit camera modules 200, 200A, 200B, 200C, 300, and/or 400 disposed on the vertical plane The reflective units 30 of the unit camera modules 200, 200A, 200B, 200C, 300, and/or 400 transfer beams of incident image light to the corresponding lens units 10 and the corresponding image sensors 20 by reflecting them, the image sensors 20 convert the beams of incident image light into electrical signals and output the electrical signals, and the electrical signals output from the image sensors 20 are synthesized by an image synthesis unit (not shown) and generate a final image, as described above.

Although the four camera modules 200 are shown as being arranged in FIG. 7, this is exemplary and two, three, five, or another number of camera modules may be arranged as needed.

Figure 8:
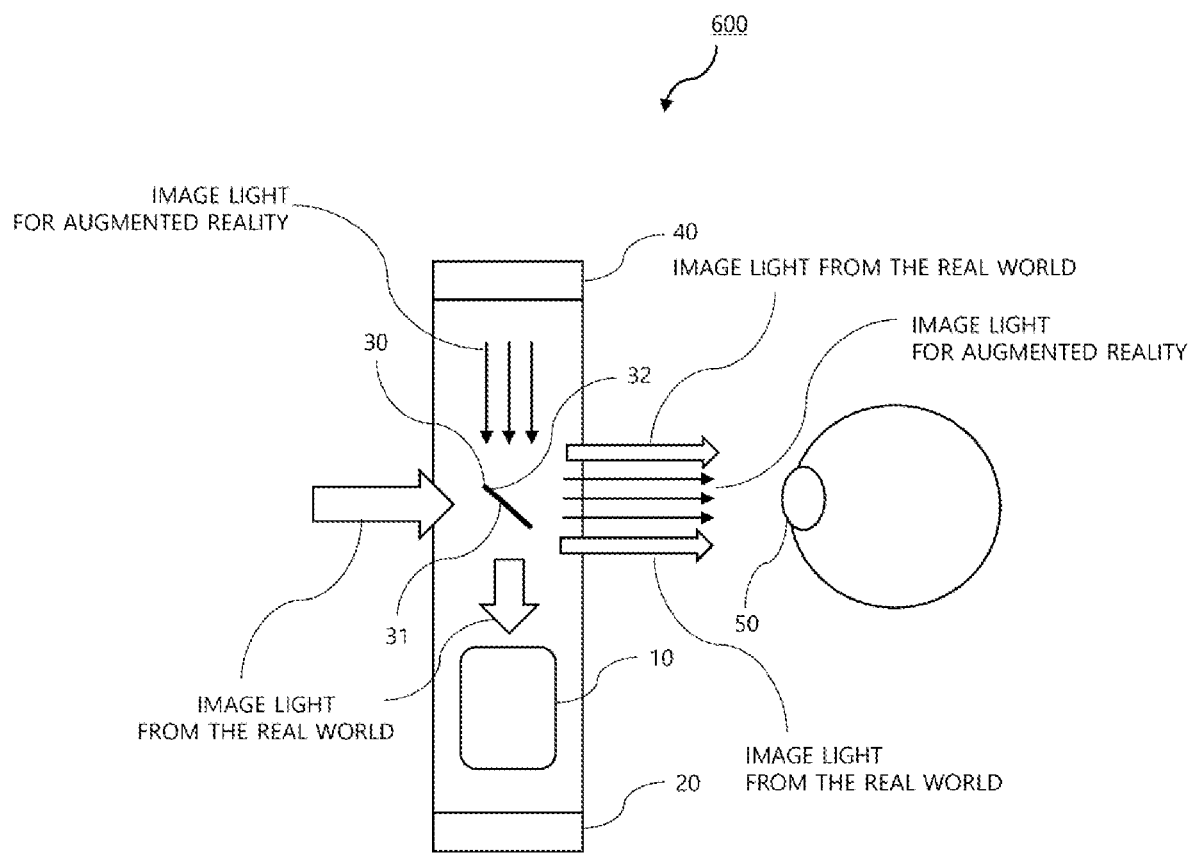
Figure 9:
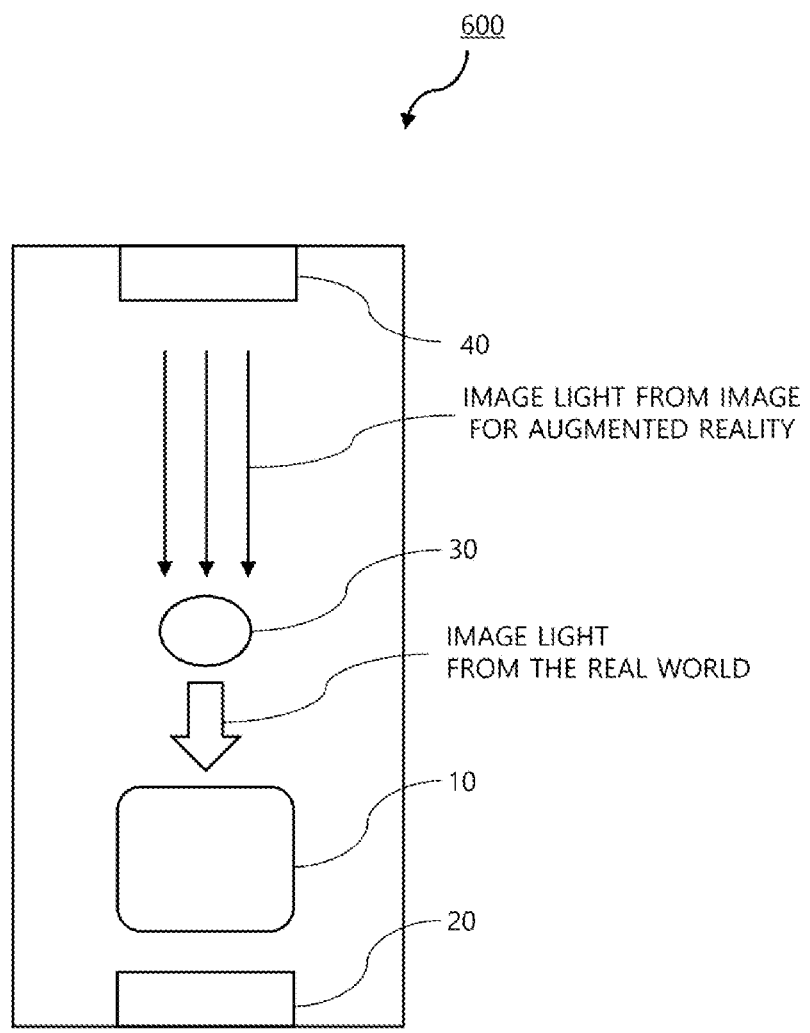

FIGS. 8 and 9 are views illustrating an optical device 600 for augmented reality including a camera module 200 according to the present invention, wherein FIG. 8 is a side view and FIG. 9 is a front view.

Referring to FIGS. 8 and 9, the optical device 600 for augmented reality includes the camera module 200 such as that described in conjunction with the above-described embodiment, and further includes an image output unit 40 configured to output image light corresponding to an image for augmented reality. In the optical device 600, the reflective unit 30 transfers image light corresponding to an image for augmented reality, output from the image output unit 40, to the pupil 50 of the eye of a user by reflecting the image light toward the pupil 50, thereby providing the image for augmented reality to the user.

The image output unit 40 is a means for outputting image light corresponding to an image for augmented reality, e.g., a display device such as a small LCD, or a reflective or refractive means for outputting image light output from a display device by reflecting or refracting the image light.

In other words, the image output unit 40 refers to a display device itself for displaying an image for augmented reality or various other means such as reflective or refractive means for emitting image light output from a display device.

Since the image output unit 40 itself is not a direct object of the present invention and is well known in the prior art, a detailed description thereof will be omitted.

Meanwhile, the image for augmented reality refers to a virtual image that, when the display device is the image output unit 40, is displayed on the display device and transferred to the pupil 50 of the user through the reflective unit 30, or a virtual image that, when the display device is not the image output unit 40, is displayed on the display device and transferred to the pupil 50 of the user through the image output unit 40 and the reflective unit 30.

Such an image for augmented reality may be a still image or a moving image in the form of an image.

An image for augmented reality is output from the image output unit 40 and transferred to the pupil 50 of the user through the reflective unit 30, thereby providing a virtual image to the user. At the same time, image light output from a real object present in the real world is transferred to the image sensor 20 through the reflective unit 30 and the lens unit 10 by the camera module 200 such as that described above. As a result, the user may be provided with the image for augmented reality and, at the same time, obtain an image corresponding to the image light from the real world.

Meanwhile, the image output unit 40 is preferably disposed in the direction opposite to the direction in which the lens unit 10 is disposed with respect to the reflective unit 30.

The reflective unit 30 is included in the camera module 200, is formed in a size of 4 mm or less, and transfers incident image light to the lens unit by reflecting it, as described above. To this end, the reflective unit 30 is disposed such that the reflective surface 31 is inclined with respect to the optical axis of incident light. Accordingly, image light incident from the real world is transferred to the image sensor 30 through the lens unit 10 by the reflective surface 31 of the reflective unit 30. At the same time, it is also transferred to the pupil 50 through the circumference of the reflective unit 30 having a smaller size than the pupil 50.

As described above, the reflective surface 31 of the reflective unit 30 other than the reflective surface 31 is preferably disposed to have an angle of 45° with the optical axis of incident light. Accordingly, since the image output unit 40 is disposed in the direction opposite to the direction in which the lens unit 10 is disposed with respect to the reflective unit 30, the reverse surface 32 of the reflective unit 30 is also preferably arranged to have an angle of 45° with the optical axis of the image light corresponding to the image for augmented reality incident from the image output unit 40.

Meanwhile, the reverse surface 32 of the reflective unit 30 other than the reflective surface 31 transfers image light corresponding to an image for augmented reality output from the image output unit 40 disposed in the direction opposite to the direction in which the lens unit 10 is disposed with respect to the reflective unit 30 to the pupil 50 of the eye of the user by reflecting the image light toward the pupil 50, thereby providing the image for augmented reality to the user.

Meanwhile, the image for augmented reality output from the image output unit 40 may be electrically synthesized with an image in the real world entering through the image sensor 20.

Meanwhile, since the reflective unit 30 is formed to have a size smaller than the size of the human pupil, i.e., 8 mm or less, more preferably 4 mm or less, in order to obtain a pinhole effect by increasing the depth of field, as described above, the depth of field for light incident onto the pupil 40 through the reflective unit 30 may be made almost infinite, i.e., considerably deep. Accordingly, there may be generated a pinhole effect that allows an image for augmented reality to be always recognized as being in focus regardless of a change in focal length even when the user changes the focal length for the real world while gazing at the real world.

Meanwhile, although the image light corresponding to the image for augmented reality output from the image output unit 40 may be directly transferred to the reflective unit 30, it may be transferred after being reflected at least once between the image output unit 40 and the reflective unit 30.

While the present invention has been described with reference to the preferred embodiments of the present invention, it is obvious that the present invention is not limited to the embodiments and other various modifications and alterations may be possible within the scope of the present invention.

The invention claimed is:

1. An optical device for augmented reality, the optical device comprising:
a camera module comprising a lens unit configured such that one or more lenses are disposed therein; an image sensor configured to convert image light, incident through the lens unit, into an electrical signal and output the electrical signal; and a reflective unit configured to transfer incident image light, incident from a real world, to the lens unit by reflecting the incident image light; and an image output unit configured to output image light corresponding to an image for augmented reality;

wherein the reflective unit of the camera module is disposed such that a reflective surface of the reflective unit is inclined with respect to the optical axis of the incident image light incident from the real world in order to reflect the incident image light, incident from the real world, to the lens unit;

wherein the reflective unit is formed in a size of 4 mm or less which is smaller than a size of a human pupil so that the image light incident from the real world to the reflective unit is transferred to the lens unit by the reflective surface of the reflective unit and at the same time, the image light from the real world is also transferred to the pupil through a circumference of the reflective unit; and wherein a reverse surface of the reflective unit other than the reflective surface of the reflective unit transfers image light corresponding to an image for augmented reality, output from the image output unit, to a pupil of an eye of a user by reflecting the image light toward the pupil of the eye of the user, thereby providing the image for augmented reality to the user.

2. The optical device of claim 1, wherein the image output unit is disposed in a direction opposite to a direction in which the lens unit is disposed with respect to the reflective unit.

3. The optical device of claim 1, wherein the image for augmented reality output from the image output unit is electrically synthesized with an image in the real world entering through the image sensor.

4. The optical device of claim 1, wherein the image light corresponding to the image for augmented reality output from the image output unit is transferred to the reflective unit after being reflected at least once between the image output unit and the reflective unit.

\* \* \* \* \*